(12) United States Patent
Hawwa et al.

(10) Patent No.: US 6,704,158 B2
(45) Date of Patent: Mar. 9, 2004

(54) SHEAR MODE MULTILAYERED COLLOCATED MICRO-ACTUATOR FOR DUAL-STAGE SERVO CONTROLLERS IN DISK DRIVES

(75) Inventors: Muhammad A. Hawwa, Fremont, CA (US); Edmund B. Fanslau, San Jose, CA (US); Kenneth F. Young, San Jose, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 342 days.

(21) Appl. No.: 09/875,413

(22) Filed: Jun. 5, 2001

(65) Prior Publication Data

US 2002/0191327 A1 Dec. 19, 2002

(51) Int. Cl.[7] .............................................. G11B 21/02
(52) U.S. Cl. ................................................... 360/77.16
(58) Field of Search ........................ 360/77.07, 294.4, 360/294.5, 77.06, 294.6, 77.16, 78.12

(56) References Cited

U.S. PATENT DOCUMENTS

| | | | |
|---|---|---|---|
| 4,775,815 A | | 10/1988 | Heinz |
| 5,027,028 A | * | 6/1991 | Skipper ........................ 310/328 |
| 5,043,621 A | * | 8/1991 | Culp ........................ 310/316.02 |
| 5,466,985 A | | 11/1995 | Suzuki |
| 5,552,658 A | | 9/1996 | Dibbern et al. |
| 5,786,655 A | | 7/1998 | Okumura et al. |
| 5,801,908 A | | 9/1998 | Akiyama et al. |
| 5,879,570 A | * | 3/1999 | Hagen .......................... 216/22 |
| 5,939,816 A | * | 8/1999 | Culp .......................... 310/328 |
| 6,020,674 A | | 2/2000 | Zhang et al. |
| 6,310,750 B1 | * | 10/2001 | Hawwa et al. ........... 360/294.6 |
| 6,313,566 B1 | * | 11/2001 | Cunningham et al. ...... 310/328 |
| 6,344,738 B1 | * | 2/2002 | Garcia et al. ................ 324/212 |
| 6,412,211 B1 | * | 7/2002 | Smith .............................. 43/4 |
| 6,594,103 B1 | * | 7/2003 | Despain et al. .......... 360/77.06 |

* cited by examiner

Primary Examiner—David Hudspeth
Assistant Examiner—Fred F. Tzeng
(74) Attorney, Agent, or Firm—Stetina Brunda Garred & Brucker

(57) ABSTRACT

A head gimbal assembly for a disk drive. The head gimbal assembly includes a load beam defining a longitudinal axis. The head gimbal assembly further includes a flexure with a portion of said flexure being attached to said load beam. The head gimbal assembly further includes a slider including a read/write head. The head gimbal assembly further includes a collocated microactuator which connects between said flexure and said slider for providing pure or nearly pure lateral movement to said slider in a plane of motion that includes the longitudinal axis. The collocated microactuator is a shear mode piezoelectric motor and disposed between the slider and the load beam along an axis disposed orthogonal to the longitudinal axis.

11 Claims, 6 Drawing Sheets

SHEAR MODE MULTILAYERED COLLOCATED MICRO-ACTUATOR FOR DUAL-STAGE SERVO CONTROLLERS IN DISK DRIVES

TECHNICAL FIELD

The present invention relates to disk drive actuator arms used with read/write heads in computer disk drives.

BACKGROUND ART

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" into which the read/write sensors and transducers are imbedded during fabrication. The goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads have become progressively smaller. This decrease in track width has allowed for dramatic increases in the recording density and data storage of disks.

Hard disk drives are typically formed with an actuator arm having a gimbal assembly with the read/write head attached. The actuator arm is positioned by using a voice coil motor (VCM), and as the disks rotate, the VCM pivots the actuator arm, moving the heads over the disk surfaces. By this rotating motion, the actuator operates to position the head above the disk to read or write data on a desired track. As storage capacity of disks increases, and tracks get narrower, the task of positioning the read/write head becomes increasingly difficult, coupled with the fact that another goal is to decrease "seek time" or the amount of time that it takes for a read/write head to locate and position itself over a desired track.

There have been several approaches to the problems of increasing the accuracy and speed of positioning the read/write heads. A current system for positioning a read/write head over a data track employs a single stage actuator. The single stage actuator includes an actuator assembly, which pivots the actuator arm, enabling the head to read data from a particular data track. The actuator assembly typically uses the VCM alone to position the head. Disk drives with single stage actuators typically achieve a memory storage density of tens of thousands of data tracks per inch (TPI), but this density can not exceed the limit of a VCM's precision.

In an effort to achieve finer control over the head positioning, a secondary actuator has sometimes been used with a two-stage actuator arm. A Head Stack Assembly (HSA) of the actuator arm is used as the two-stage actuator arm, and generally has a fixed portion and a movable portion, within the overall arm. The read/write head is attached to the end of the movable portion, and micro-actuators are connected between the two portions. When activated, the micro-actuator provides finer positioning adjustments to the coarser positioning provided by the VCM. These micro-actuators have used piezoelectric materials, which vary their length or shape when a voltage is applied to them. Some prior actuators have had a hinge portion connecting the fixed and movable portions, and others have had the two portions completely separated from each other with only the micro-actuators connecting them. However, this type of actuator can have problems with out-of plane movement, as the slider is caused to roll slightly. This type of motion can potentially risk damage to the disk surface, or detrimental change in fly height (spacing of head to disk). In addition to this potential out-of-plane motion, these actuators can possibly excite the load beam vibratory modes. Such excitation would limit the ability of the servo control system to achieve high bandwidth.

The data tracks are ideally symmetrical and uniform in curvature, but in practice, irregularities occur. These irregularities make it necessary for the actuators to make small adjustments in position in order for the head to remain centered on the tracks. Disks typically include servo information, which is read along with the other stored data. This servo information is sent to the control system, which then generates control signals, which help to steer the head back on track. For example, as the head encounters an irregularity in the track and begins to deviate from the track, the servo information signal can communicate this change to the control system, which then may activate a voltage to one of the micro-actuator motors to steer the head back in the direction of the track. The speed with which these irregularities can be sensed and corrected is an important factor in the proper operation of the disk drive. The number of these minute corrections, which can be achieved each second is referred to as "bandwidth", and is measured in cycles per second. The greater the bandwidth, the greater the reliable operating speed of the disk drive can be, and ultimately, this allows greater storage capacity of the system.

Servo control systems generally operate better if the servo sensor and the actuator are near each other, rather than being separated in distance. The positioning of the sensor, in this case the read/write head, and the actuator in the same location is known as co-location or "collocation" as the term has evolved in the industry, and collocation generally results in improved bandwidth, and faster response time.

Potential difficulties exist with collocation configurations. The actuators are desired to be as small as possible so that they do not adversely affect the performance of the drive by adding too much additional mass or bulk to the actuator arm. The face of the slider, which faces the disk is configured as an Air Bearing Surface (ABS) which has a distributed load over its face from the air pressure generated between the ABS and the spinning disk surface. This is balanced by a spring force generated through the load beam, a force, which can be as low as 30 mN (3 grams-force) or less. The performance of the actuator to move the slider as it makes its many micro-corrections of position could be adversely affected by the friction inherent in the system. The smaller the friction force to be overcome, the smaller the actuator can be, with accompanying advantages of reduced mass and volume, and thus improved performance for the disk drive, and increased practical storage capacity for the system.

FIG. 2 shows an actuator arm 2 which has an arm beam 6, which is configured in two parts which include a stationary part 12 and a movable part 14 which are connected by a narrow hinge portion 16. Two piezoelectric actuators 18 are connected between the two parts 12, 14, and act as a push-pull mechanism to direct the movable part 14. A slider 20 including a read/write head 22 is shown at the end of the movable part 14 of the actuator arm 2. A Voice Coil Motor (VCM) 9 acts as a primary actuator 7 and provides coarse positioning of the overall arm, and the piezoelectric actuators act as secondary actuators 8.

This is an example of a secondary actuator 8 in which the sensor, the read/write head 22 is separated from the actuator mechanisms 18, and thus the bandwidth is typically in the range of 1.5–3.0 kHz, which is improved compared to a bandwidth of 800–1 kHz typical for an actuator without secondary actuation, but less than that expected from a collocated actuator. In contrast, it is estimated that the bandwidth of collocated actuators is typically greater than 5 kHz.

Collocated actuators can have many configurations, but generally they include a Head Gimbal Assembly (HGA) having a load beam, and a flexure, also known as a gimbal, which is a thin springy member which functions as a leaf spring, as well as a slider containing the read/write head. Typically, actuators in the form of strips or tiny bars have been used, which have two ends, which will be referred to as the head end and the foot. In this configuration, the foot end is attached to the flexure, which acts as the stationary part and anchoring point for the actuators. The head end is attached to the slider or to a mount to which the slider is attached. When the actuators are activated by application of appropriate voltage, they deform in one of a variety of ways which serves to move the slider either laterally or laterally with some component of rotational movement with respect to the flexure. This movement is opposed by the friction generated when the upper surface of the slider rubs the lower surface of the flexure through translational movement. In addition, whenever there is frictional force which could result in abrasion of contacting surfaces, there is the possibility of freeing tiny particles, which can contaminate components. Thus, by reducing the frictional force and the contact areas involved, the risk of micro-contamination can be reduced.

Additionally, the fabrication of the HGA is made more complex when more than one actuator is used. For the sake of easy manufacturability, it is desired that the actuator configuration be as simple as possible.

Thus there is a need for a disk drive having a co-located actuator which is able to attain higher servo bandwidth than those non-collocated types of dual stage actuators and is designed for, such that friction forces on the gimbal structure during operation would be minimum.

DISCLOSURE OF INVENTION

Accordingly, it is an object of the present invention to provide an HGA for a disk drive which has co-located actuators, with associated large bandwidth.

Another object of the invention is to provide head gimbal assembly which uses shear motor actuators which provide pure or nearly pure translational movement.

Another object of the invention is to provide a design that has little to no friction in the micro actuation structure.

A further object of the present invention is to provide a HGA, which acts through pure or nearly pure translation to provide secondary collocated actuation.

An additional object of the present invention is to reduce the mass and/or volume of the HGA, and thus improve the operational dynamics of the system.

An additional object of the present invention is to reduce the micro-contamination caused by friction inside disk drives.

Briefly, one preferred embodiment of the present invention is a head gimbal assembly for a disk drive, having a load beam, a flexure, a portion of the flexure being attached to the load beam, a slider, which includes a read/write head, and a collocated microactuator, which connects between the flexure and the slider. The collocated microactuator is a shear mode piezoelectric motor for providing pure or nearly pure lateral movement to the slider, thus providing secondary actuation for the head gimbal assembly.

A disk drive including an actuator arm with the head gimbal assembly are also disclosed. The disk drive includes a servo control system which sends control signals to activate the secondary actuation of the head gimbal assembly.

An advantage of the present invention is that the present invention provides large bandwidth.

Another advantage of the present invention is that the HGA acts through pure or nearly pure translation, and moves unopposed by contact with the flexure thus providing a reduced frictional force.

And another advantage of the present invention is that a single shear motor is used which attaches between the slider and the flexure, and is thus less complex and requires less complex surrounding components than are used with multiple strip actuators.

A further advantage of the present invention is that improved dynamic performance is provided for the system.

An additional advantage is that enhanced tribology performance prevents micro-contamination. There is no friction preventing movement, mechanical hysteresis, or particulation of the material of the motor.

These and other objects and advantages of the present invention will become clear to those skilled in the art in view of the description of the best presently known mode of carrying out the invention and the industrial applicability of the preferred embodiment as described herein and as illustrated in the several figures of the drawings.

SUMMARY OF THE INVENTION

A multilayered piezoelectric micro-actuator is disclosed, which is embedded between a suspension flexure and a read/write slider, and which performs as a tiny electromechanical motor in the shear mode. When voltage is applied to the motor, it deforms laterally, causing the slider to move slightly. The small lateral motion of the slider is used with a dual-stage servo control to compensate for off-track shifts due to disk drive runouts, vibrations, thermal and other effects.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
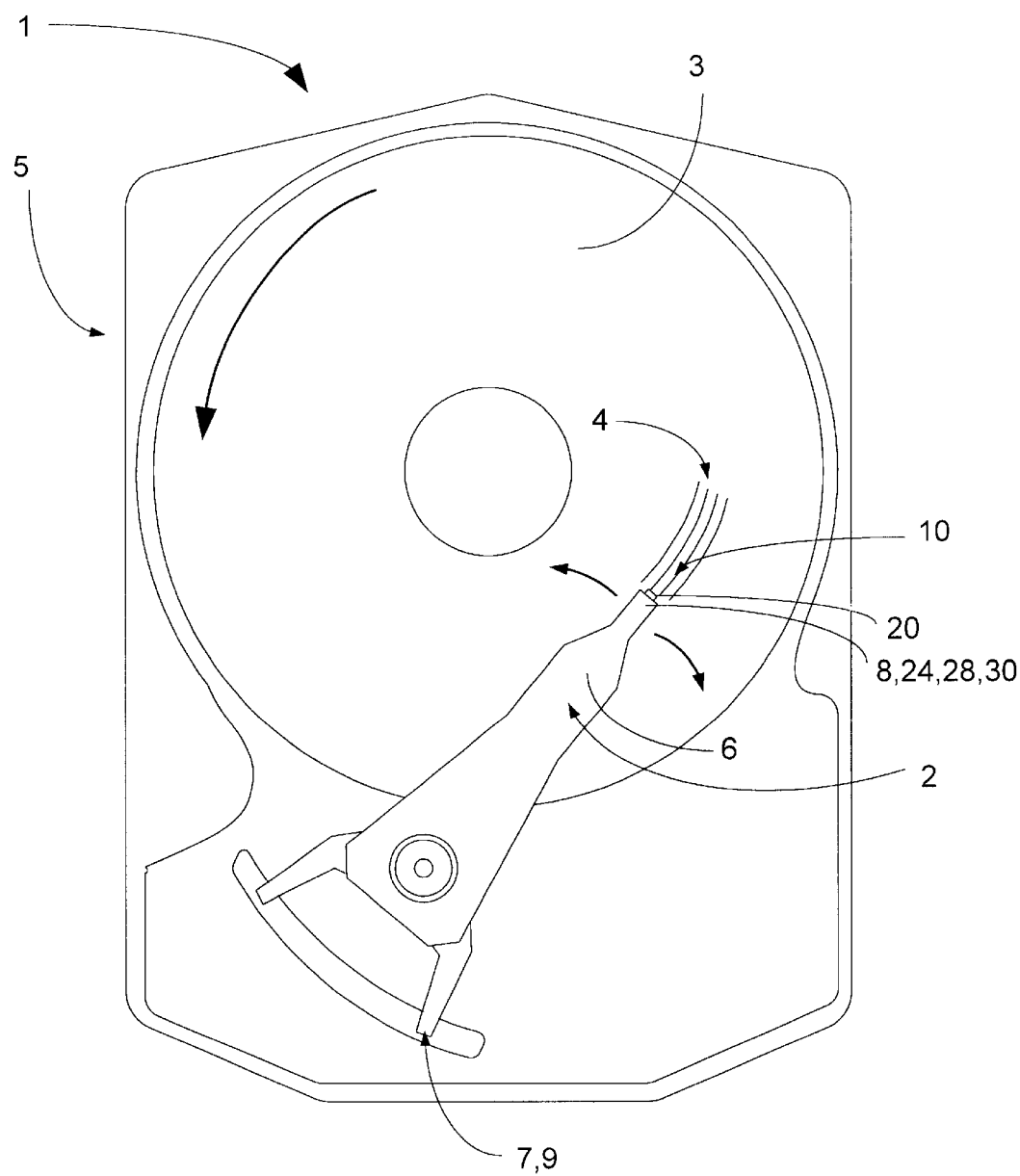
FIG. 1 shows a top plan view of a disk drive including the head gimbal assembly of the present invention.
Figure 2:
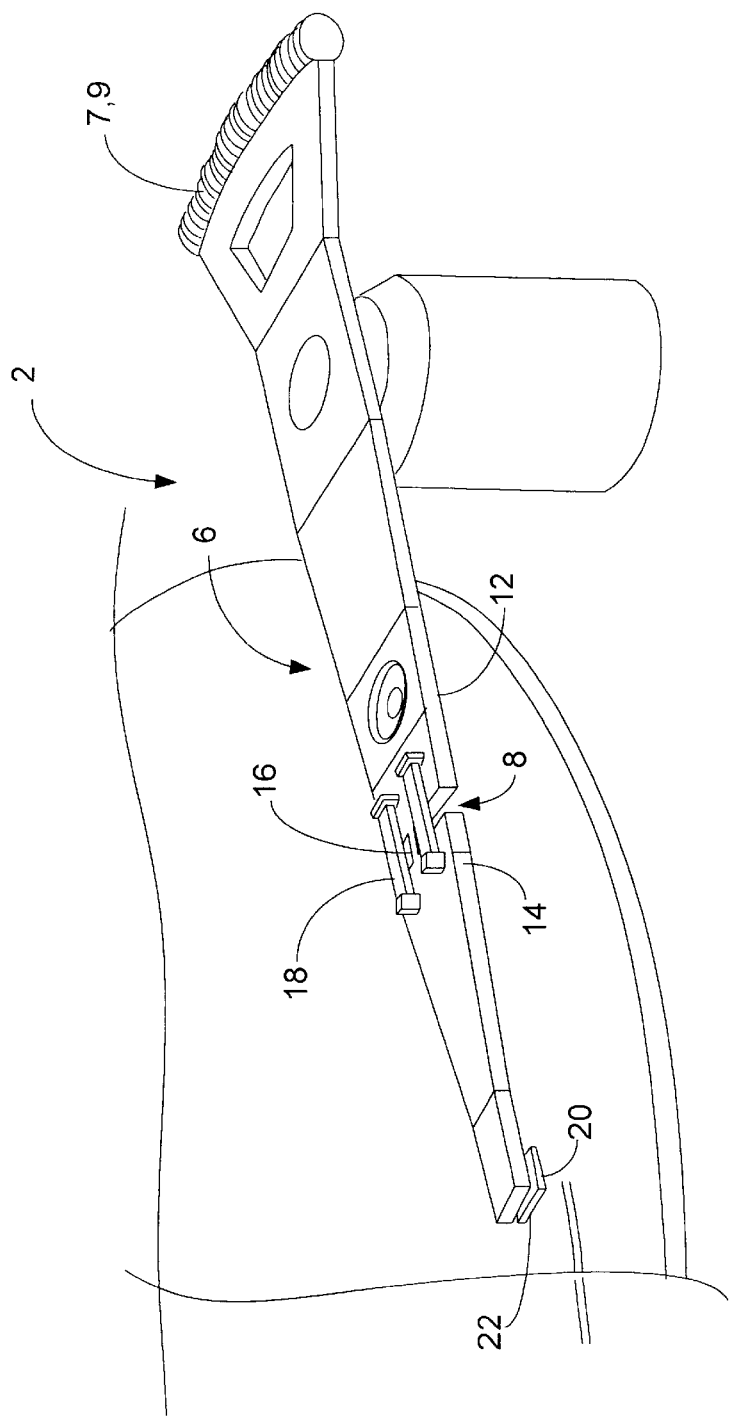
FIG. 2 illustrates a prior art actuator arm, which has secondary actuators which are not collocated.

FIG. 1 shows a top plan view of a disk drive 1, which includes an actuator arm 2, a data storage disk 3 which has data tracks 4, and an enclosure 5. The actuator arm 2 generally includes an arm beam 6, and a VCM 9, which acts as a primary actuator 7, and a head gimbal assembly 10. The head gimbal assembly 10 includes a load beam 28, flexure 30, slider 20 and secondary actuator 8, which is a collocated actuator 24. These are seen in greater detail in FIG. 5 below.

Figure 3:
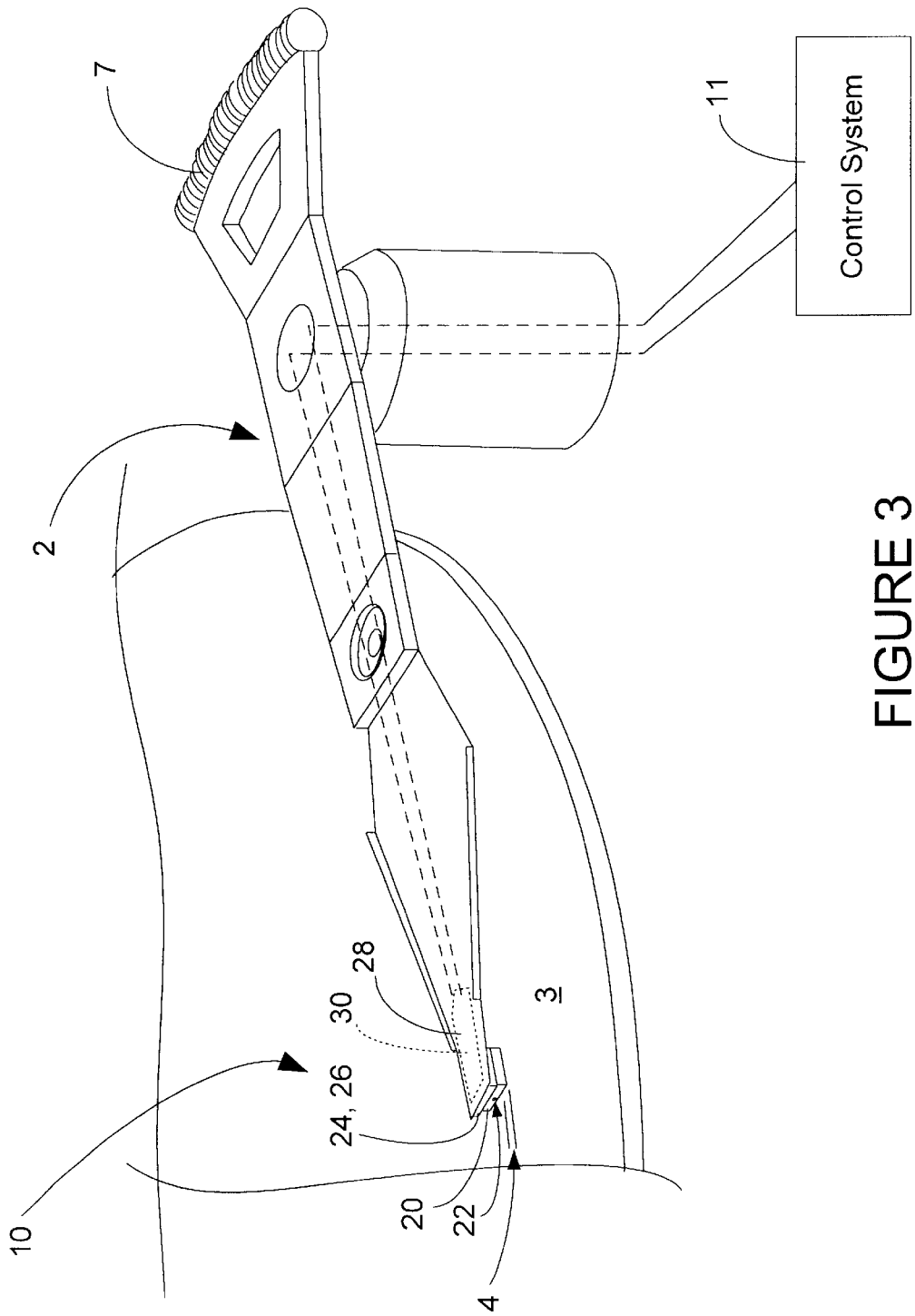
FIG. 3 shows an actuator arm having collocated secondary actuation.

FIG. 3 shows an actuator arm 2, which has a collocated actuator 24, which in this case is a shear mode piezoelectric motor 26. It includes a Head Gimbal Assembly (HGA) with shear mode actuator 10 of the present invention, having a load beam 28, and a flexure 30, also known as a gimbal, which is a thin springy member which functions as a leaf spring, which supports the slider 20, but allows for a slight amount of vertical movement as the leaf spring deflects.

Figure 4:
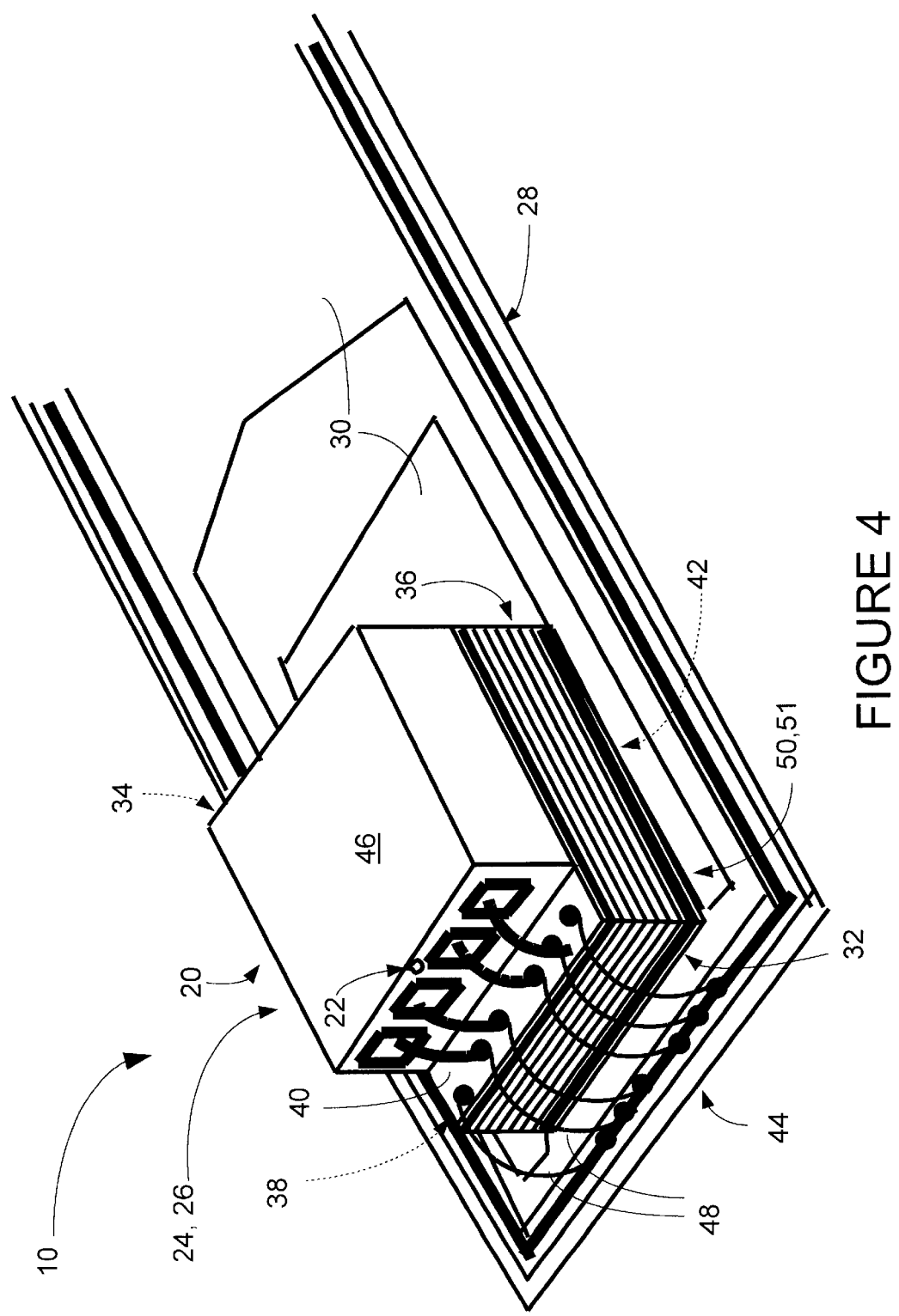
FIG. 4 illustrates a detail isometric view of the head gimbal assembly of the present invention.

FIG. 4 shows a bottom detail view of a Head Gimbal Assembly (HGA) 10, in which the load beam 28, flexure 30, and collocated shear mode actuator 24 can be seen, as well as a slider 20 containing the read/write head 22, which is shown in dashed line. The actuator 24 has two ends, which will be referred to as the head end 32 and the foot 34, as well as a right side 36, a left side 38, and a top side 40 and bottom side 42. These names are assigned from a view point looking from the tip 44 of the HGA 10, and with the understanding that in practice the HGA 10 will generally be inverted so that what is referred to as the top side 40, will face the disk 3 (see FIG. 1) and will serve as the Air Bearing Surface (ABS) 46. For simplicity, the ABS 46 is shown as a flat surface, however, in practice this surface will generally be contoured with topography which will establish areas of high and low pressure, which will determine the flying dynamics of the slider 20.

The shear mode actuator 24 is located between the slider 20 and the flexure and is equipped with electrical leads 48 which supply electrical voltage to the shear mode actuator 24 which is in the form of a stack 50 of piezoelectric layers 51. These are shown in more detail in FIG. 5, along with x, y, and z axes, 52, 54, 56 respectively and further detail is shown in FIGS. 6–8. "Piezoelectric" is a general term which includes a number of materials, one of which commonly used is PZT or lead zirconium titanate. Although this material is preferred for this application, the invention is not limited to the use of PZT, and the material PZT is itself subject to variation in composition by differing manufacturers.

Figure 5:
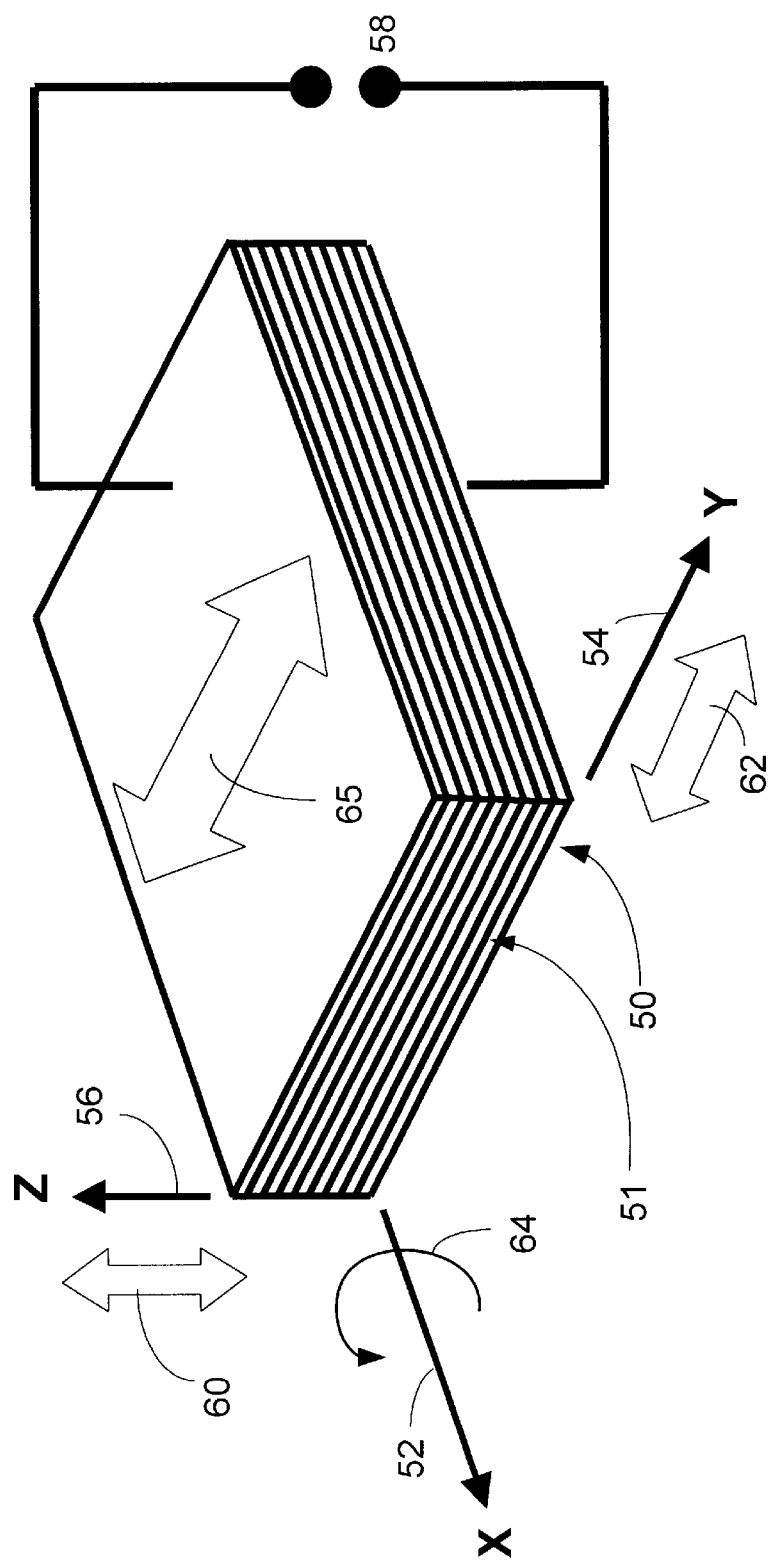
FIG. 5 shows a top isometric view of the piezoelectric motor of the present invention.
Figure 6:
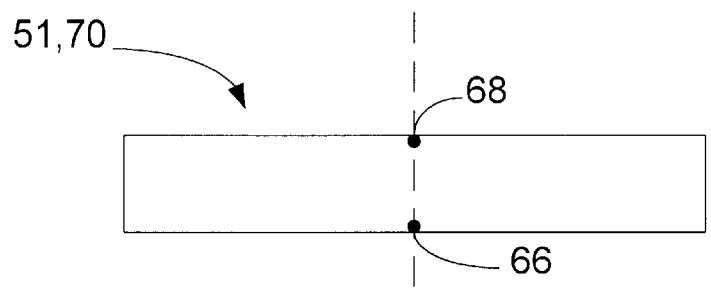
FIG. 6 illustrates a front plan view of a single piezoelectric layer of the present invention with two aligned points, with the layer in an inactive state.
Figure 7:
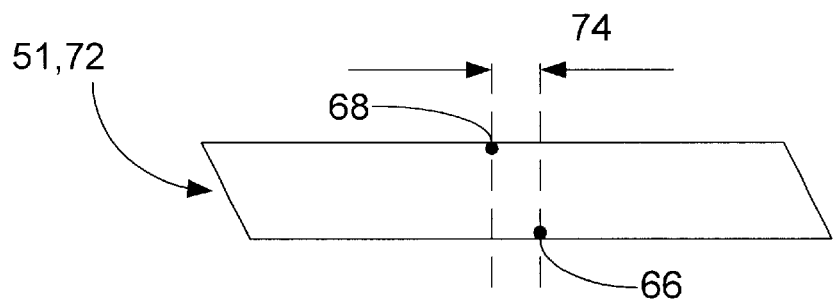
FIG. 7 shows a front plan view of a single piezoelectric layer, and the new relative positions of the previously aligned points, when the layer is in an activated state.
Figure 8:
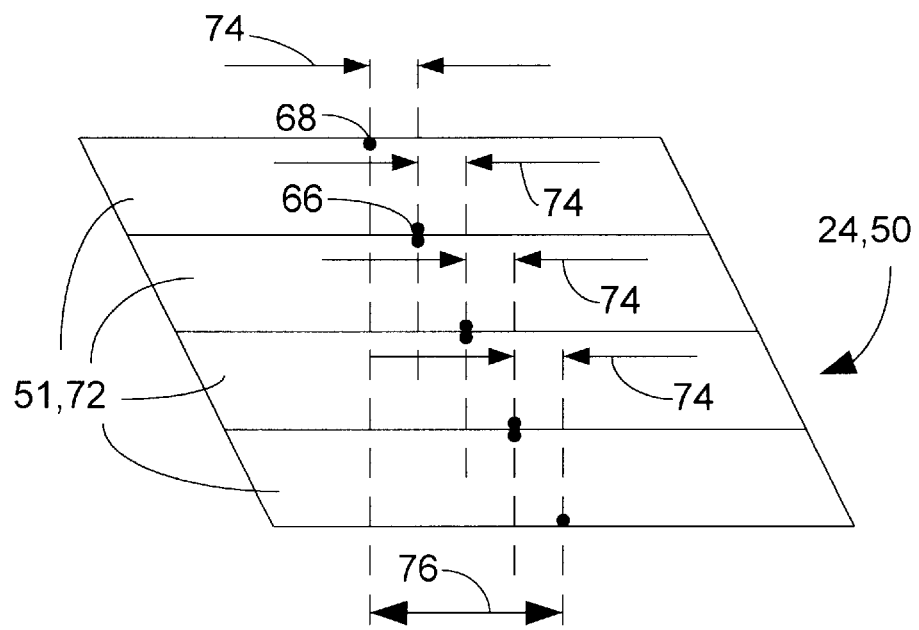
FIG. 8 illustrates a stack of piezoelectric layers and the cumulative displacement created by the individual displacements of the layers.

Referring now to FIGS. 4–8, and particularly to FIG. 5, when an appropriate voltage is applied by the power supply 58, an electric field vector 60 is established in a direction parallel to the z axis 56, and a polarization vector 62 is established parallel to the y axis 54. A torque 64 is thus created around the x axis 52, producing the indicated movement 65, which is also parallel to the y axis 54. FIG. 6 shows a single piezoelectric layer 51 with 2 aligned points 66, 68 as they are located with the actuator in an inactive state 70. FIG. 7 shows these same two points as the upper point 68 has shifted sideways when the actuator is in an activated state 72, with the lateral displacement 74 indicated. FIG. 8 shows a stack 50 of piezoelectric layers 51 all of which have been activated by the application of voltage, showing the cumulative displacement 76 of the individual displacements 74. The effect is to produce a pure or nearly pure lateral motion in the actuator 24, which displaces the slider in a pure or nearly pure translational manner with little or no rotational component.

Referring now also to FIG. 3, and as discussed above, the data tracks 4 are ideally symmetrical and uniform in curvature, but in practice, irregularities occur which can result in what is called "non-repeatable run-out". These irregularities make it necessary for the actuator 24 to make small adjustments in position in order for the head 22 to remain centered on the tracks 4. Disks 3 typically include servo information, which is read along with the other stored data. This servo information is sent to the control system 11, which then generates control signals, which help to steer the head 22 back on track. For example, as the head 22 encounters an irregularity in the track 4 and begins to deviate from the track 4, the servo information signal can communicate this change to the control system 11, which then may activate a voltage to the micro-actuator shear motor 24 to steer the head 22 back in the direction of the track 4.

The piezoelectric material is preferably configured in a stack of thin layers 51, because the activation voltage for the material depends on its thickness. There is a practical limit on the voltage which is to be applied to the piezoelectric material, because application of very high voltages can generate electric and magnetic field fringe effects which may cause cross-talk and interfere with the writing and reading of the data fields on the disks 3. In addition, high voltage power supplies have inherent disadvantages as to cost and safety. Thus it is desired that the applied voltage be 30 volts or less. A number of thin layers, electrically connected in series, each of which has an applied voltage of 30 volts or less is thus favored over a single block of material of equivalent thickness, which would require a much higher activation voltage. Each layer 51 thus contributes it own individual displacement 74, and the cumulative effect produces the overall displacement 76, as described above.

Currently, a stack of 6–8 layers is preferred, and such motors are commercially available, although, to the inventors' knowledge, have not before been used for this type of application.

The co-located actuator 24 of the present invention 10 thus can make adjustments very quickly, resulting in a servo bandwidth of 5 KHz or more, compared with a bandwidth in the range of 1.5–3.0 kHz for non-collocated secondary actuators and a bandwidth of 800–1 kHz typical for an actuator without secondary actuation.

The present invention 10 does not have the opposition of external friction, thus, a smaller actuation force is required, which allows the use of smaller actuators, which have smaller mass and/or volume of the HGA 10, and thus improve the operational dynamics of the system.

The present invention 10 also preferably uses a single shear motor 26, which attaches between the slider and the flexure, and is thus less complex and requires less complex surrounding components than are used with multiple strip actuators. The present invention is thus easier to assemble than many previous devices.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A head gimbal assembly for a disk drive, comprising:
   a load beam defining a longitudinal axis;
   a flexure, a portion of said flexure being attached to said load beam;

a slider including a read/write head; and a collocated microactuator which connects between said flexure and said slider for providing pure or nearly pure lateral movement to said slider in a plane of motion that includes the longitudinal axis, said collocated microactuator being a shear mode piezoelectric motor, the microactuator is disposed between the slider and the load beam along an axis disposed orthogonal to the longitudinal axis.

2. A head gimbal assembly as in claim 1, wherein:

said shear mode piezoelectric motor is a stack of thin layers of piezoelectric material, which are electrically connected in series.

3. A head gimbal assembly as in claim 2, wherein:

said shear mode piezoelectric motor is formed from PZT.

4. An actuator arm for a disk drive comprising:

an arm beam having first and second ends, and having a primary actuator for coarse positioning of a read/write head at said first end, and a head gimbal assembly at said second end which provides secondary actuation, said head gimbal assembly including:

a load beam a longitudinal axis;

a flexure, a portion of said flexure being attached to said lad beam;

a slider including a read/write head; and a collocated microactuator which connects between said flexure and said slider for providing pure or nearly pure lateral movement to said slider in a plane of motion that includes the longitudinal axis, said collocated microactuator being a shear mode piezoelectric motor, the microactuator is disposed between the slider and the load beam along an axis disposed orthogonal to the longitudinal axis.

5. An actuator arm assembly as in claim 4, wherein:

said shear mode piezoelectric motor is a stack of thin layers of piezoelectric material, which are electrically connected in series.

6. An actuator arm assembly as in claim 5, wherein:

said shear mode piezoelectric motor is formed from PZT.

7. A disk drive with collocated secondary position actuation comprising:

an enclosure including at least one rotatable data storage disk having data tracks;

one or more actuator arms, each arm having a primary actuator for coarse positions of said actuator arm relative to said data tracks, and a head gimbal assembly, which provides secondary actuation;

said head gimbal assembly including:

a load beam a longitudinal axis;

a flexure, a portion of said flexure being attached to said load beam a slider including a read/write head; and a collocated microactuator which connected between said flexure and said slider for providing pure or nearly pure lateral movement to said slider in a plane of motion that includes the longitudinal axis, said collocated microactuator being a shear mode piezoelectric motor, the microactuator is disposed between the slider and the load beam along an axis disposed orthogonal to the longitudinal axis.

8. The disk drive recited in claim 7, wherein:

said shear mode piezoelectric motor is a stack of thin layers of piezoelectric material, which are electrically connected in series.

9. The disk drive recited in claim 8, wherein:

each of said thin layers of piezoelectric material operates on an applied voltage of 30 volts or less.

10. The disk drive recited in claim 9, wherein:

said shear mode piezoelectric motor is formed from PZT.

11. The disk drive recited in claim 9, which further comprises a servo control, which detects deviations from the data tracks and produces servo control signals which activate said collocated microactuator to steer the read/write head back onto the data track.

* * * * *